United States Patent [19]

Nakamichi et al.

[11] Patent Number: 5,756,029
[45] Date of Patent: May 26, 1998

[54] MOLDING PROCESS FOR MANUFACTURING A MOLDED PRODUCT CONTAINING ANOTHER MOLDED PRODUCT

[75] Inventors: Kousaku Nakamichi; Kazunori Miura; Keiji Ohira, all of Shizuoka, Japan

[73] Assignee: Kabushiki Kaisha Bandai, Japan

[21] Appl. No.: 502,917

[22] Filed: Jul. 17, 1995

[30] Foreign Application Priority Data

Oct. 25, 1994 [JP] Japan ................. 6-284142

[51] Int. Cl.[6] .................... B29C 45/06; B29C 45/16; B29C 45/27
[52] U.S. Cl. ............... 264/161; 264/250; 264/273
[58] Field of Search .................. 264/274, 275, 264/250, 255, 273, 161

[56] References Cited

U.S. PATENT DOCUMENTS

| 2,285,963 | 6/1942 | Gils. | |
|---|---|---|---|
| 2,908,941 | 10/1959 | Sabo. | |
| 3,302,242 | 2/1967 | Morin | 264/273 |
| 3,354,249 | 11/1967 | Morin | 264/273 |
| 3,914,081 | 10/1975 | Aoki | 425/130 |
| 4,732,724 | 3/1988 | Sterner | 264/273 |
| 4,988,472 | 1/1991 | Orimoto et al. | 264/273 |
| 5,464,578 | 11/1995 | Salter et al. | 264/275 |
| 5,527,502 | 6/1996 | Kiuchi et al. | 264/274 |

FOREIGN PATENT DOCUMENTS

| 0 147 571 | 7/1985 | European Pat. Off. . |
| 60-199622A | 2/1986 | Japan . |
| 61-171317A | 12/1986 | Japan . |
| 2084508 | 4/1982 | United Kingdom . |

*Primary Examiner*—Angela Y. Ortiz
*Attorney, Agent, or Firm*—Graham & James

[57] ABSTRACT

A molding process includes forming a primary molded product having interlocking projections and holes in a primary mold. The product is transferred into a secondary mold having interlocking grooves and pins, and secured therein by the engagement of the projections and holes of the product with the grooves and pins, respectively, of the secondary mold. A secondary molded product containing the primary molded product as an insert is formed without having any undesirable displacement of the insert caused by the injection of a molding material at a high pressure. An appropriate molding apparatus is also disclosed.

5 Claims, 12 Drawing Sheets

MOLDING PROCESS FOR MANUFACTURING A MOLDED PRODUCT CONTAINING ANOTHER MOLDED PRODUCT

BACKGROUND OF THE INVENTION

1. Field of the Invention

This invention relates to a process and an apparatus for manufacturing a molded product containing another molded product inserted therein.

2. Description of the Prior Art

There is known a molding apparatus which comprises a movable mold mounted on the movable side of an injection molding machine and a stationary mold mounted on its stationary side. If the injection molding machine is operated to join the movable and stationary molds together, the molds define a primary mold cavity and a secondary mold cavity therebetween. A synthetic resin material is injected into the primary mold cavity to make a primary molded product as a first molding step. The primary molded product is transferred into the secondary mold cavity together with runners forming a part of the molded product. Then, another synthetic resin material is injected into the secondary mold cavity to carry out a second molding step for making a secondary molded product enclosing the primary molded product.

It has been a typical practice to rely upon the runners for holding the primary molded product in the secondary mold cavity. The runners are formed in channels which are so positioned as to suit the shape of the mold and the position of an injection unit and thereby facilitate the smooth injection of the material into the mold. Accordingly, the runners may be so formed as to support the primary molded product only at one end or side thereof and may not hold it securely in the secondary mold cavity. If such is the case, the injection of the material at a high pressure into the secondary mold cavity may cause the undesirable displacement of the primary molded product, resulting in the secondary molded product having a wrongly positioned joint, or an outwardly protruding portion of the primary molded product.

SUMMARY OF THE INVENTION

Under these circumstances, it is an object of this invention to provide a molding process or apparatus which ensures the manufacture of a secondary molded product in which a primary molded product is held in its right position.

This object is attained by a molding process comprising the steps of:

(a) forming a primary molded product having interlocking projections and holes in a primary mold;

(b) transferring the primary molded product into a secondary mold having interlocking grooves and pins; and (c) securing the primary molded product in the secondary mold by the engagement of the interlocking projections and holes with the interlocking grooves and pins, respectively, and forming a secondary molded product containing the primary molded product as an insert.

The above object is also attained by a molding apparatus comprising:

(a) movable mold-defining member mounted on the movable side of an injection molding machine and a stationary mold-defining member mounted on its stationary side;

(b) the mold-defining members defining a primary mold and a secondary mold when joined together;

(c) the movable mold-defining member being provided with means for transferring a primary molded product from the primary mold to the secondary mold;

(d) the primary mold having a primary mold cavity in which the primary molded product is formed, recesses in which interlocking projections are formed on the primary molded product, and protrusions by which interlocking holes are formed in the primary molded product;

(e) the secondary mold having a secondary mold cavity in which a secondary molded product enclosing the primary molded product is formed, interlocking grooves in which the interlocking projections on the primary molded product are engageable, and interlocking pins which are engage able in the interlocking holes of the primary molded product.

If the injection molding machine is operated to join the movable and stationary mold-defining members, they define the primary and secondary molds, and the machine is operated to inject a synthetic resin material into the primary mold to form a primary molded product having interlocking projections and holes. The machine is operated to separate the movable mold-defining member from the stationary one, and the primary molded product is transferred to the secondary mold. The mold-defining members are joined again, whereupon the primary molded product is held securely in the secondary mold by the engagement of its interlocking projections and holes with the interlocking grooves and pins, respectively, of the secondary mold. A different synthetic resin material is, then, injected into the secondary mold to form a secondary molded product enclosing the primary molded product. The engagement as described above ensures that no undesirable displacement of the primary molded product be caused by the injection of the material at a high pressure into the secondary mold.

DETAILED DESCRIPTION OF THE INVENTION

Figure 1:
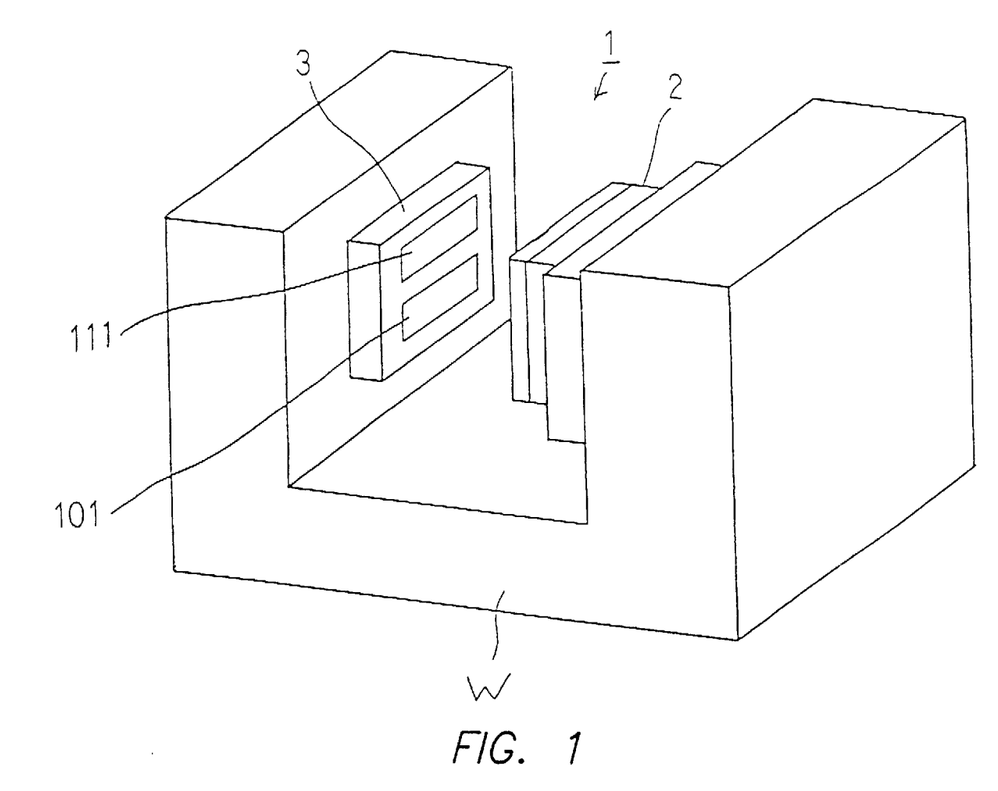
FIG. 1 is a schematic perspective view of an apparatus embodying this invention and mounted to an injection molding machine.
Figure 2:
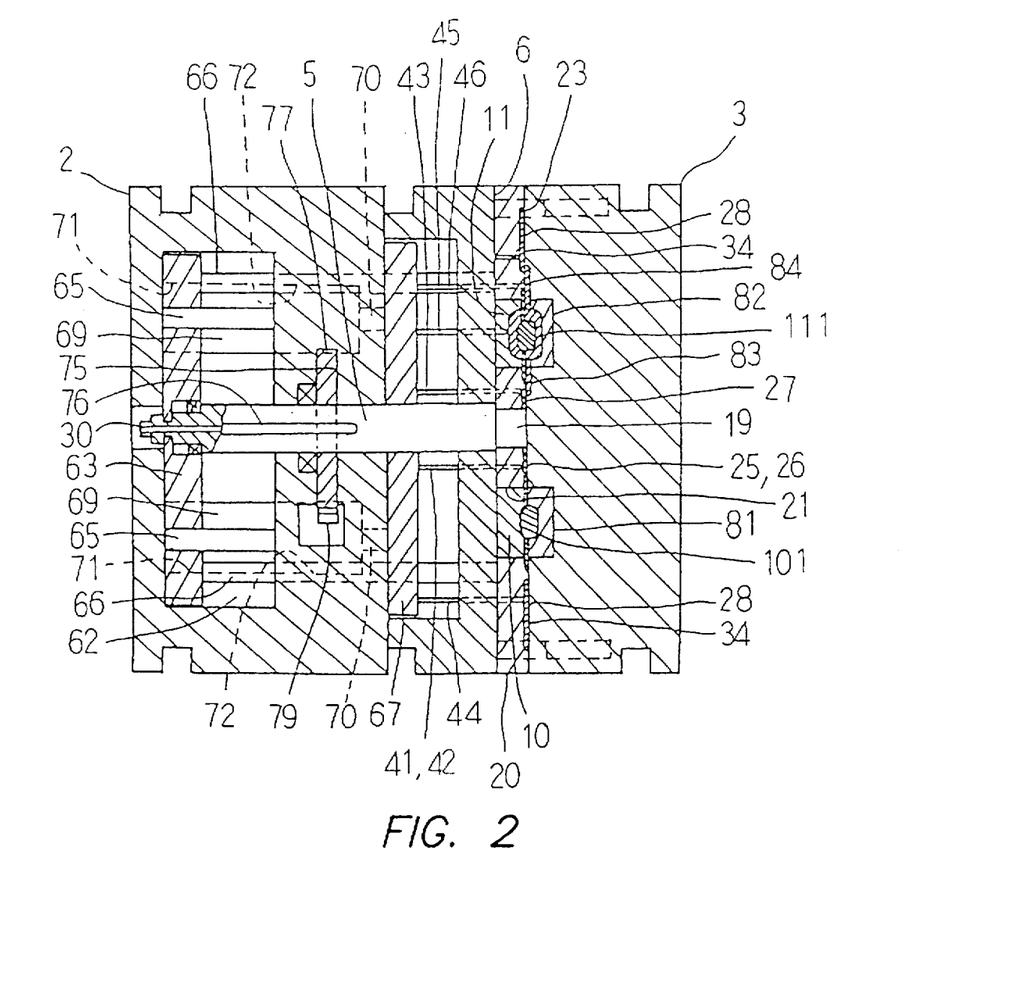
FIG. 2 is a side elevational view, partly in section, of the apparatus.
Figure 3:
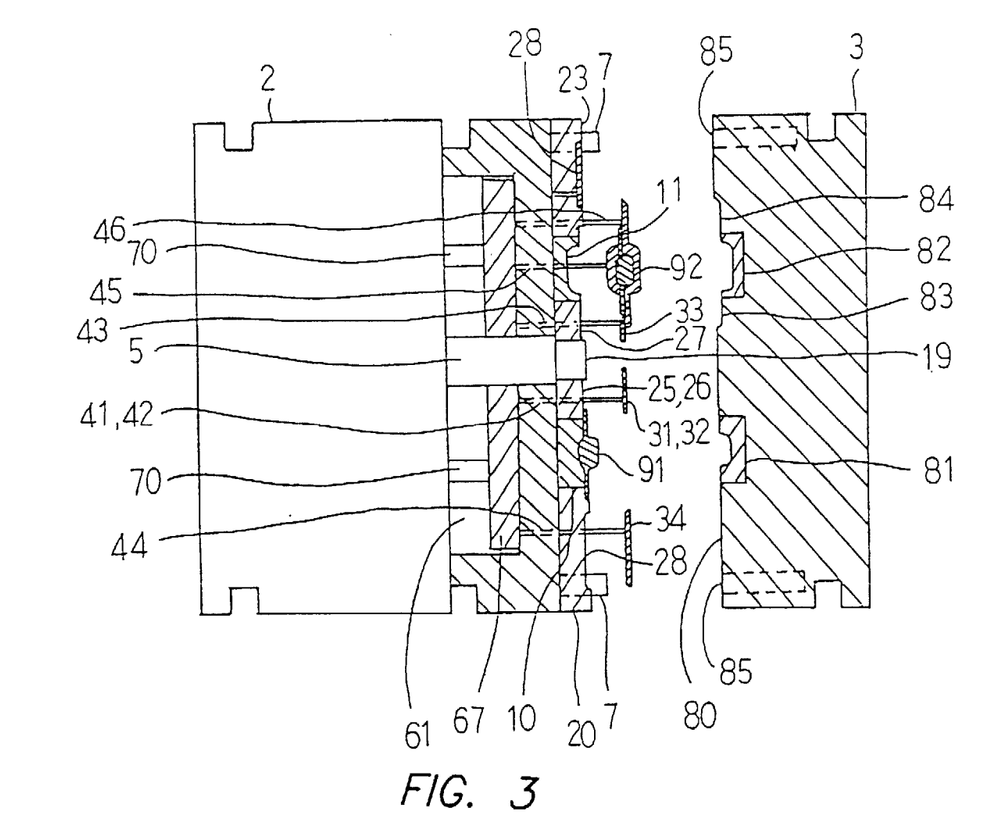
FIG. 3 is a side elevational view, partly in section, of the apparatus in one operating position.
Figure 4:
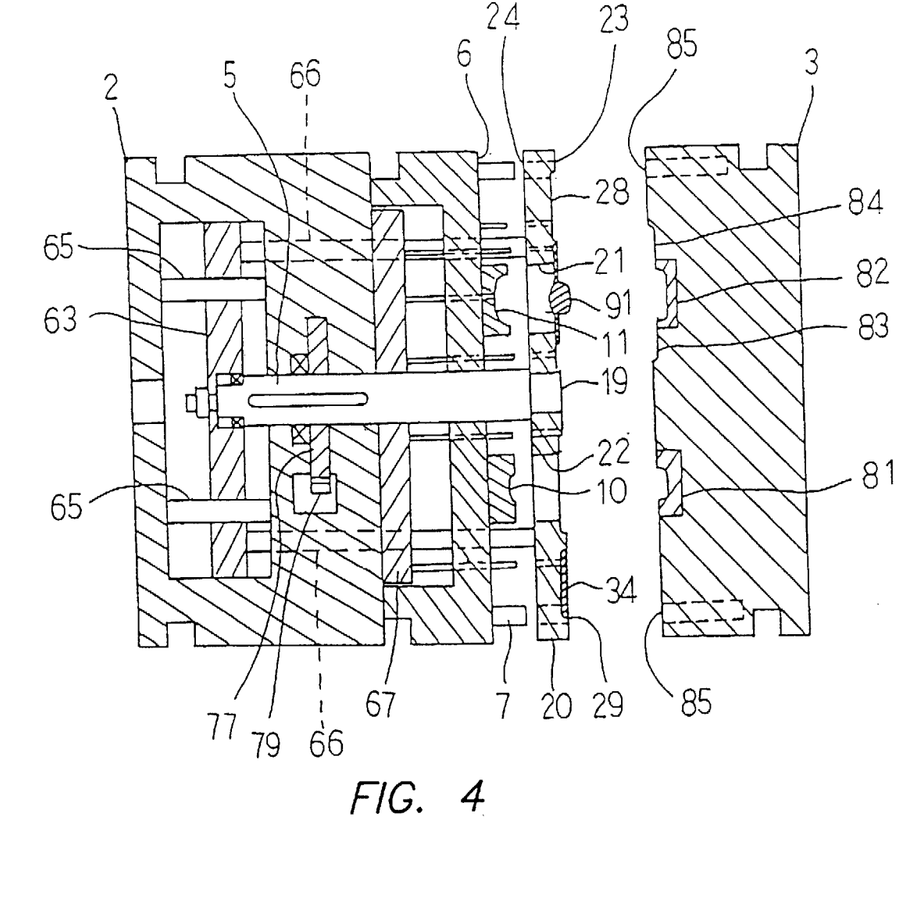
FIG. 4 is a view similar to FIG. 3, but showing the apparatus in a different operating position.

A molding apparatus embodying this invention is schematically shown at 1 in FIG. 1, and comprises a movable mold-defining member 2 mounted on the movable side of an injecting molding machine W and a stationary mold-defining member 3 mounted on its stationary side. A rotary shaft 5 extends through approximately the center of the movable mold-defining member 2, and is rotatable about its own axis and slidably toward the stationary mold-defining member 3, as shown in FIGS. 2 to 4. The movable mold-defining member 2 has a surface 6 to which a first mold-defining portion 10 and a second mold-defining portion 11 are secured by bolts, etc. on the opposite side of the rotary shaft 5 from each other.

Figure 5:
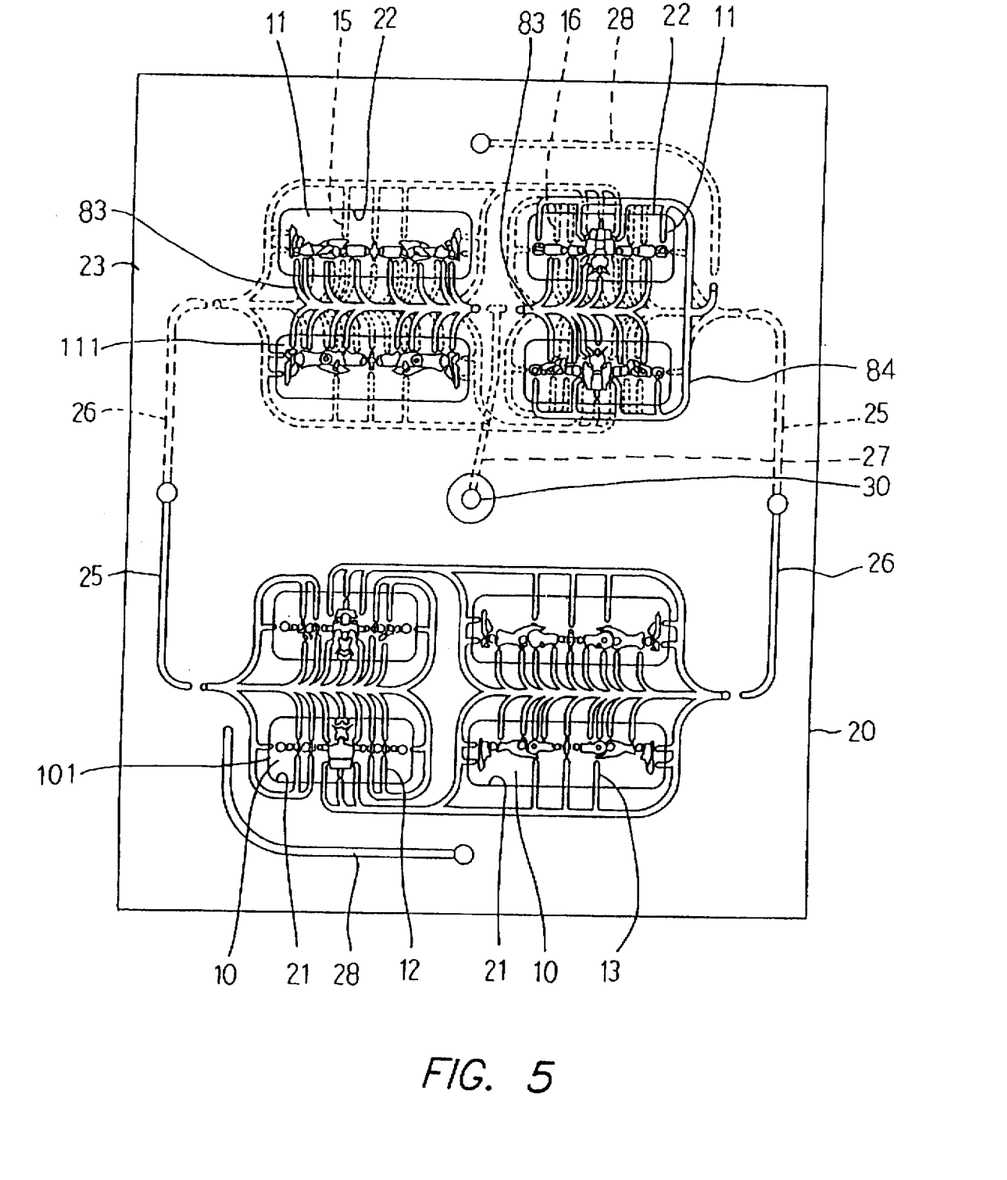
FIG. 5 is a top plan view, partly in section, of the apparatus in one operating position.

The first mold-defining portion 10 has runner channels 12 and 13 and the second mold-defining portion 11 likewise has channels 15 and 16 which are identical in shape to the channels 12 and 13, as shown in FIG. 5. The runner channels formed in the movable mold-defining member 2 are shown by solid lines in the lower half of FIG. 5, which shows that part of the apparatus in which a primary molded product is made, and by broken lines in its upper half, which shows that part of the apparatus in which a secondary molded product is made, while the runner channels formed in the stationary mold-defining member 3 are shown by solid lines in the upper half of FIG. 5.

The rotary shaft 5 has a protruding end portion 19 which faces the stationary mold-defining member 3, and to which a rotary table 20 is secured. The rotary table 20 has through holes 21 and 22 in which the second and first mold-defining portions 11 and 10 can respectively be fitted. The rotary table 20 has a surface 23 facing the stationary mold-defining member 3 and provided with runner channels 25 and 26 for supplying a synthetic resin material to the first mold-defining portion 10 and runner channels 27 and 28 for supplying a synthetic resin material to the second mold-defining portion 11. The runner channel 27 is connected to an axial passage 30 extending through the rotary shaft 5 from its rear end to its front end.

The movable mold-defining member 2 has a front chamber 61 and a rear chamber 62 which contains a first base 63 which is slidable along guide pins 65.

The rotary shaft 5 has a rear end portion supported rotatably by the first base 63. Pressing shafts 66 extend through the movable mold-defining member 2 and have their front ends held against the rear surface 24 of the rotary table 20, while their rear ends are secured to the first base 63.

The front chamber 61 contains a second base 67 which is movable back and forth. The second base 67 is provided with ejector pins 45 and 46 for ejecting a secondary molded product and ejector pins 41 to 44 for ejecting runners 31 to 34 from the runner channels 25 to 28 of the rotary table 20. The second base 67 is attached to the ends of driving shafts 70 projecting from a pair of hydraulic cylinders 69 mounted in the rear chamber 62. Each cylinder 69 is supported in one of a pair of holes 71 formed in the first base 63 and in one of a pair of recesses 72 formed in the front wall of the rear chamber 62.

The movable mold-defining member 2 has in its midportion an intermediate chamber 75 containing a spur gear 77 attached to the rotary shaft 5 and engaging a spline key 76. The spur gear 77 meshes with a rack 79 attached to a driving rod extending from a hydraulic cylinder secured to the movable mold-defining member 2, but not shown.

The stationary mold-defining member 3 has a surface 80 facing the movable mold-defining member 2 and having a first mold-defining portion 81 which defines a primary mold 101 with the first mold-defining portion 10 of the movable mold-defining member 2 when they are joined, and a second mold-defining portion 82 which defines a secondary mold 111 with the second mold-defining portion 11 when they are joined. The surface 80 also has runner channels 83 and 84 for supplying a synthetic resin material into the secondary mold 111.

Figure 10:
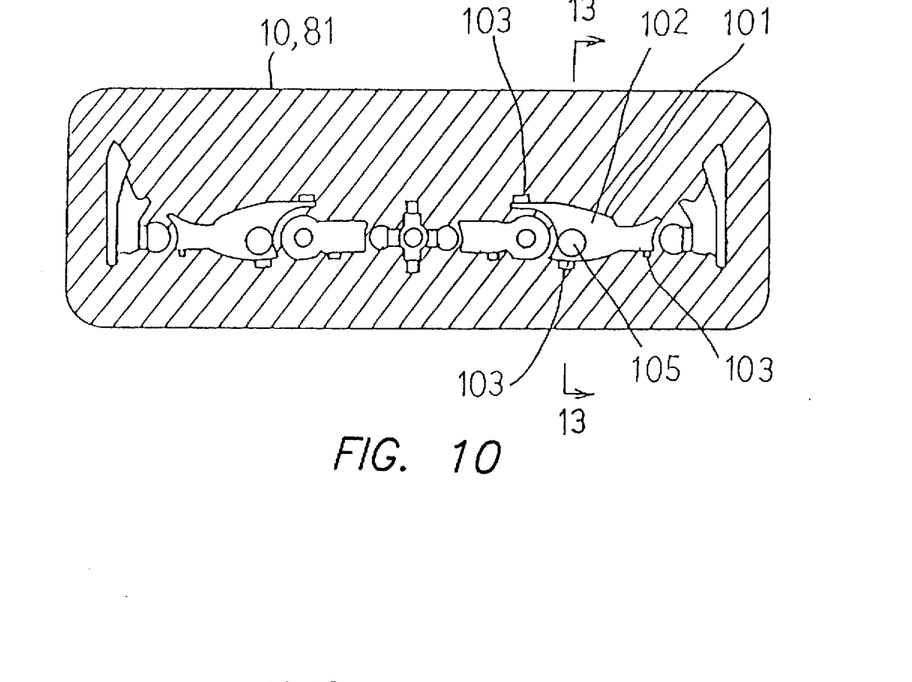
FIG. 10 is an enlarged top plan view of a section of the apparatus.
Figure 13:
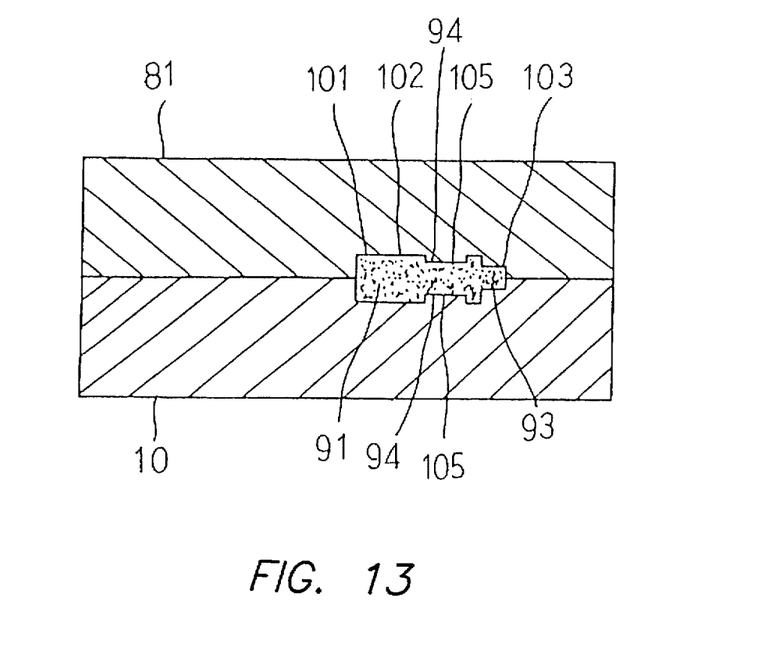
FIG. 13 is a sectional view taken along the line X—X of FIG. 10.

The primary mold 101 has a primary mold cavity 102 and auxiliary recesses 103 defined when the first mold-defining portions 10 and 81 of the mold-defining members 2 and 3 are joined together, as shown in FIG. 10. The first mold-defining portions 10 and 81 also have protrusions 105 projecting into the primary mold cavity 102, as shown in FIG. 13.

Figure 11:
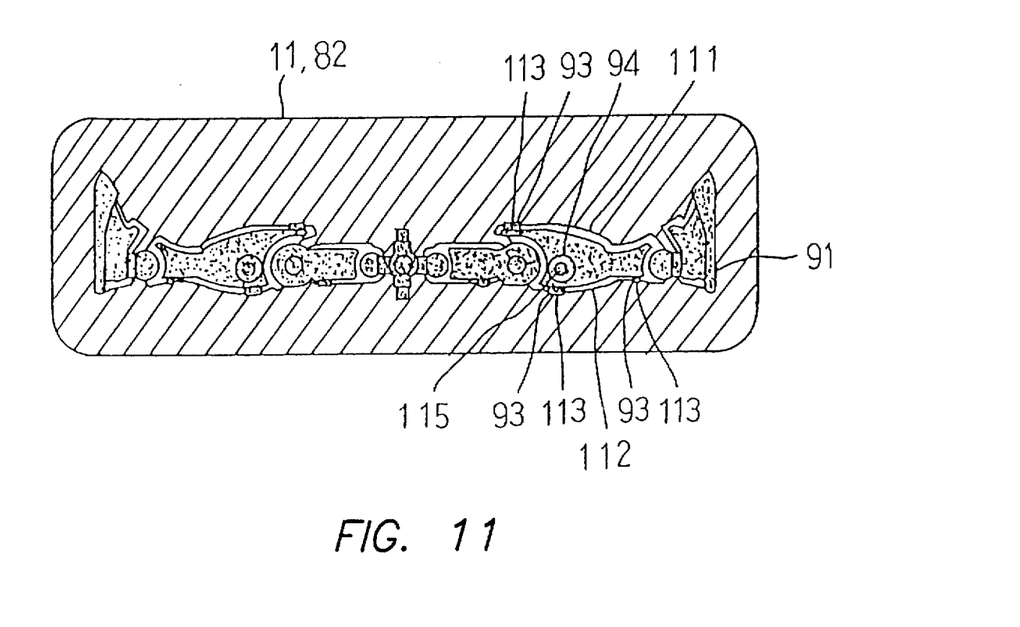
FIG. 11 is a view similar to FIG. 10, but showing the apparatus in a different operating position.
Figure 12:
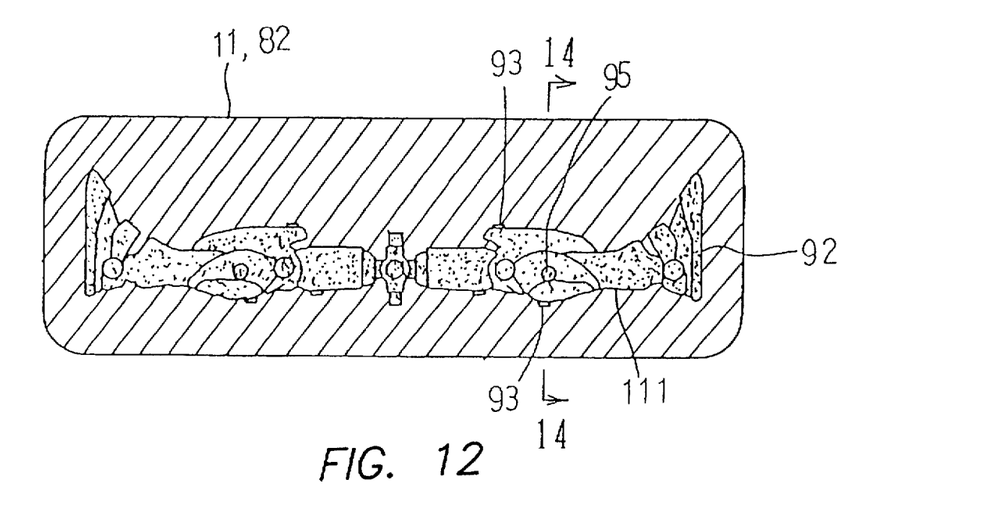
FIG. 12 is a view similar to FIG. 11, but showing the apparatus in a still different operating position.
Figure 14:
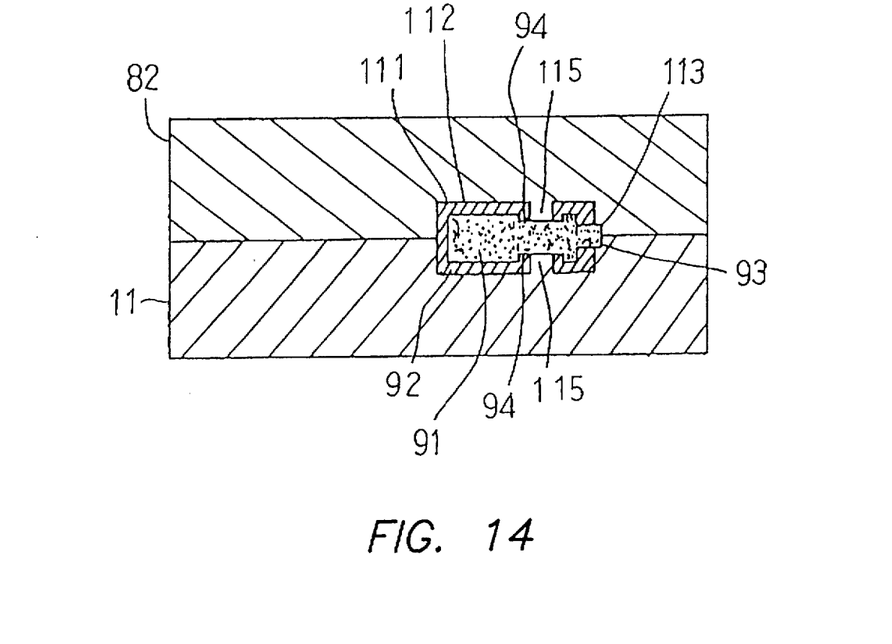
FIG. 14 is a sectional view taken along the line Y—Y of FIG. 12.

The secondary mold 111 has a secondary mold cavity 112 and interlocking grooves 113, as shown in FIG. 11. The second mold-defining portions 11 and 82 also have interlocking pins 115 projecting into the secondary mold cavity 112, as shown in FIG. 14.

The primary mold 101, or its cavity 102, recesses 103 and protrusions 105 may alternatively be formed by one of the first mold-defining portions 10 and 81. The secondary mold 111, or its cavity 112, grooves 113 and pins 115 may likewise by formed by one of the second mold-defining portions 11 and 82.

Guide pins 7 project from the surface 6 of the movable mold-defining member 2 into guide holes 29 formed in the rotary table 20 and guide holes 85 formed in the surface 80 of the stationary mold-defining member 3 for positioning the rotary table 20 and the stationary mold-defining member 3.

The movable and stationary mold-defining members 2 and 3 have a vertical mating plane, and the primary mold 101 is situated below the secondary mold 111. The injection molding machine W has an injection nozzle not shown and an injection unit not shown, either. In operation, the injection nozzle is connected to the rear end of the rotary shaft 5, while the injection unit is connected to the movable mold-defining member 2 so as to be connected with the runner channels 25, 26 and 28.

Figure 6:
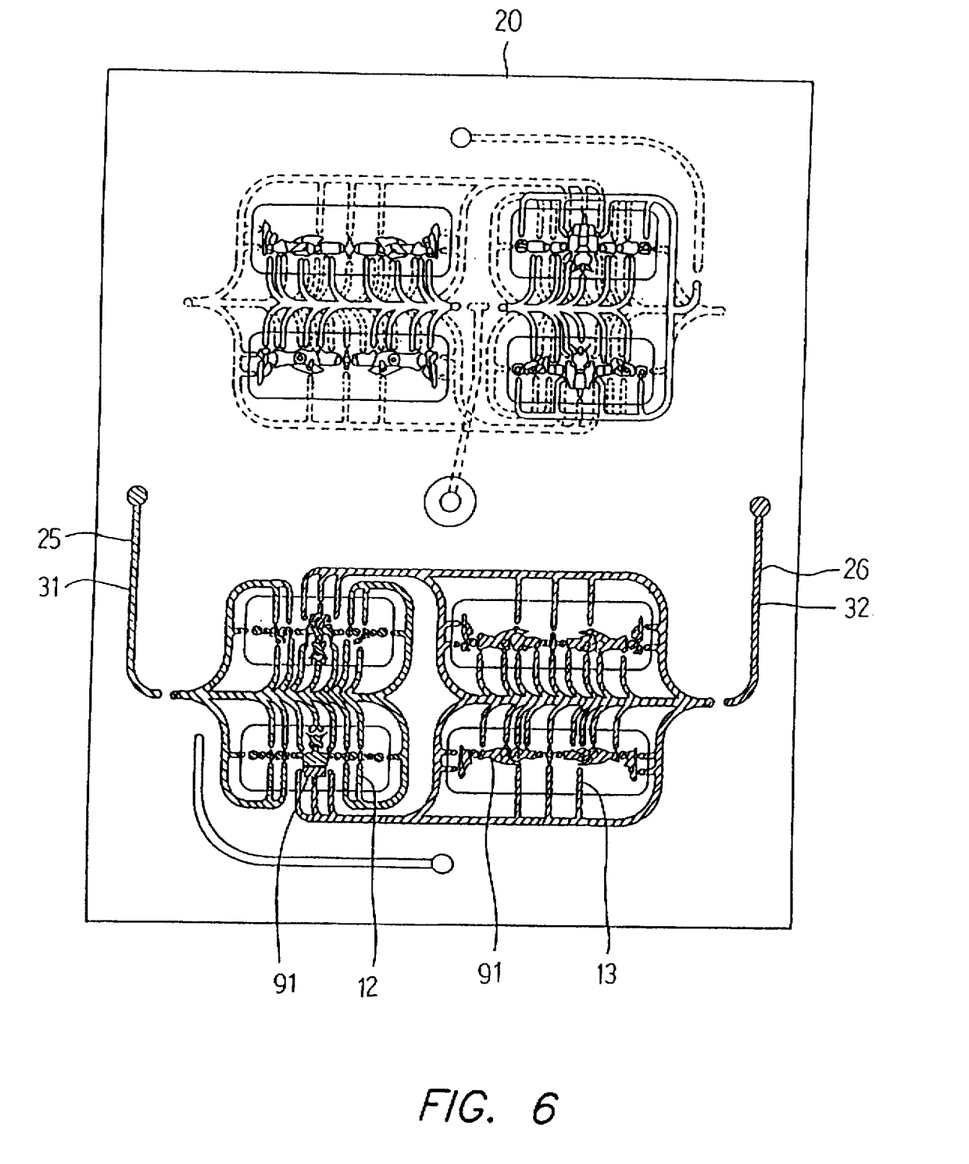
FIG. 6 is a view similar to FIG. 5, but showing the apparatus in a different operating position.

The machine W is operated to join the movable mold-defining member 2 to the stationary mold-defining member 3 as shown in FIG. 2. The injection unit is actuated to inject a synthetic resin material into the runner channels 25 and 26, as shown in FIG. 6, so that the material may flow into the primary mold 101 through the runner channels 12 and 13 to form a primary molded product 91. The molded product 91 has interlocking projections 93 formed by the primary mold cavity 102 of the primary mold 101 and the recesses 103, as shown in FIG. 10 and FIG. 11, and interlocking holes 94 formed by the protrusions 105, as shown in FIG. 13.

Then, the machine W is operated to separate the movable mold-defining member 2 from the stationary mold-defining member 3, as shown in FIG. 3. The hydraulic cylinders 69 are actuated to advance the second base 67, so that the ejector pins 41 and 42 may eject the runners 31 and 32 from the runner channels 25 and 26. The runners 31 and 32 fall down off the movable mold-defining member 2, as shown in FIG. 7.

The hydraulic cylinders 69 are actuated again to retract the second base 67 and the ejector pins 41 and 42, and the first base 63 is advanced to advance the shafts 5 and 66 and thereby the rotary table 20, as shown in FIG. 4. The primary molded product 91 is advanced with the rotary table 20 to which the runners adhere.

Figure 7:
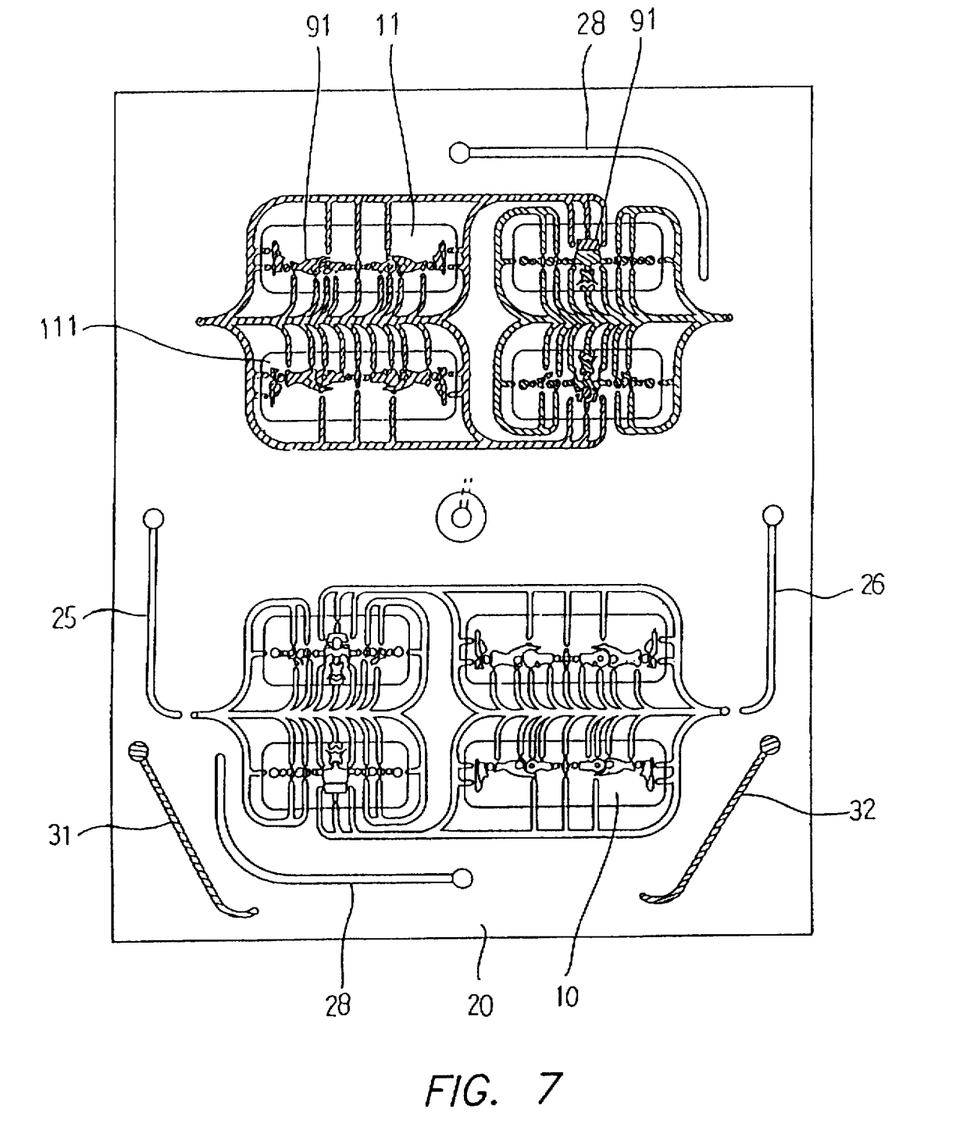
FIG. 7 is a view similar to FIG. 6, but showing the apparatus in a still different operating position.

The hydraulic cylinder, not shown, is actuated to move the rack 79 to rotate the spur gear 77 and thereby the rotary table by 180°, as shown in FIGS. 4 and 7. Then, the first base 63 is retracted, so that the primary molded product 91 may be transferred to the second mold-defining portion 11, while the guide pins 7 fit in the guide holes 20 of the table 20 to hold it in position.

Then, the movable mold-defining member 2 is joined again to the stationary mold-defining member 3, so that the secondary mold 11 may be defined and hold the primary molded product 91 therein. The molded product 91 is held against vertical or horizontal displacement by the engagement of its interlocking projections 93 with the interlocking grooves 113 of the secondary mold 111, as shown in FIGS. 11 and 14. It is also held against horizontal displacement to and fro by the engagement of its interlocking holes 94 with the pins 115 of the secondary mold 111. Either the projections 93 or the holes 94 may alternatively be sufficient for holding the molded product 91 against displacement in the secondary mold 111. It may also be sufficient to provide the holes 94 only on one side instead of in a pair.

Figure 8:
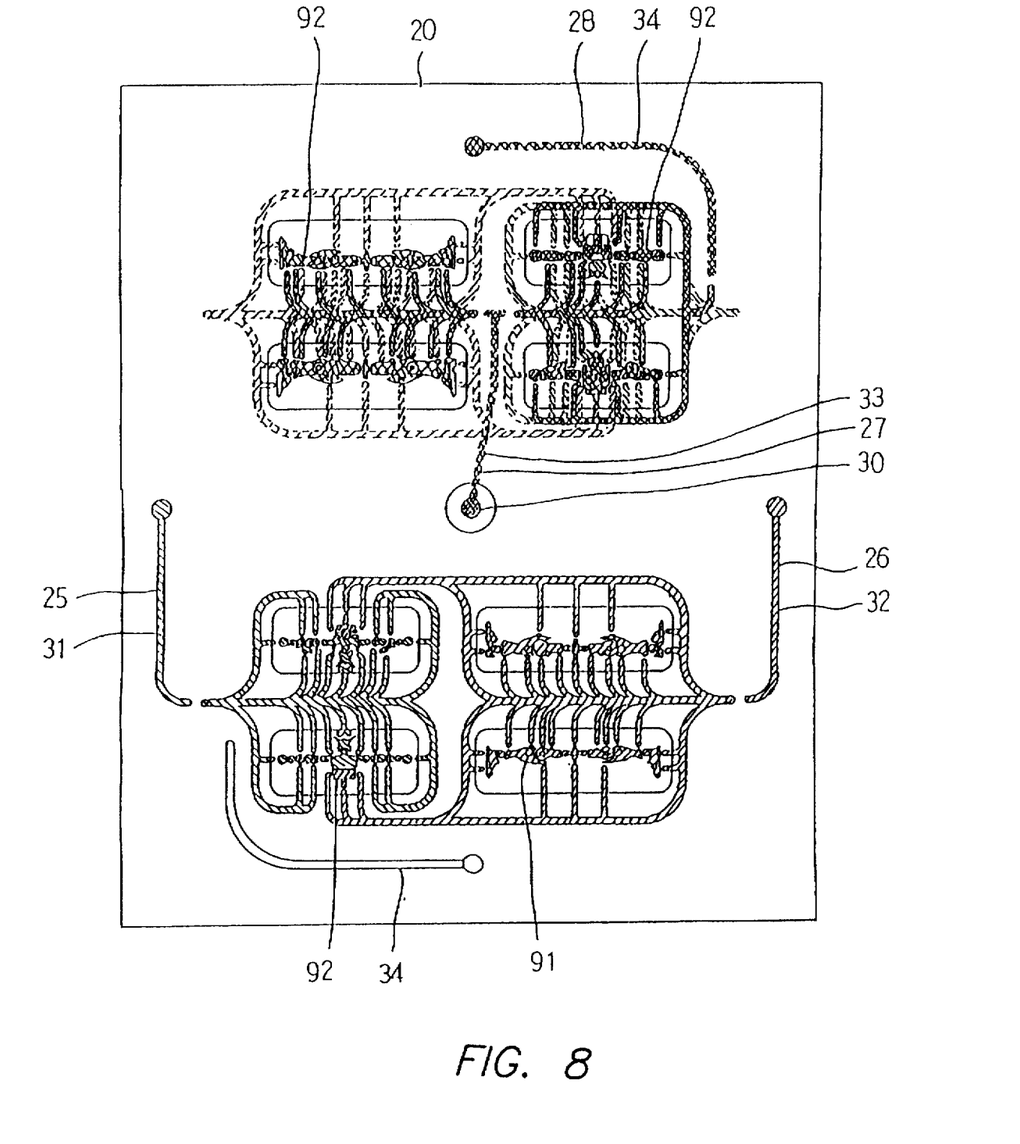
FIG. 8 is a view similar to FIG. 7, but showing the apparatus in a still different operating position.
Figure 15:
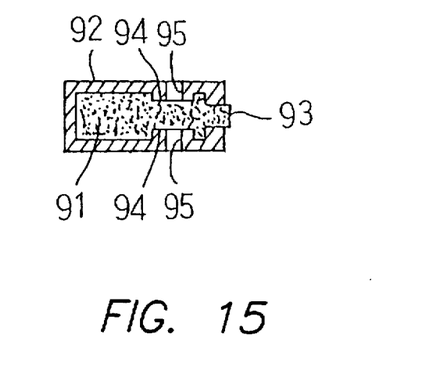
FIG. 15 is a cross sectional view of a secondary molded product.

Then, the injection nozzle is actuated to inject a synthetic resin material at a high pressure into the axial passage 30 of the rotary shaft 5, so that the material may flow into the secondary mold 111 through the runner channel 27 in the rotary table 20 and the runner channels 83 in the stationary mold-defining member 3. The injection unit is also actuated to inject the synthetic resin material at a high pressure into the runner channel 34, so that the material may flow into the secondary mold 111 through the runner channels 84 in the stationary mold-defining member 3, as shown in FIG. 14. There is formed a secondary molded product 92 enclosing the primary molded product 91 and its interlocking projections 93, as shown in FIG. 15, while another primary molded product 91 is simultaneously formed in the primary mold, as shown in FIG. 8. The primary molded product 91 in the secondary mold 111 is held against any undesirable displacement despite the injection of the material at a high pressure.

Figure 9:
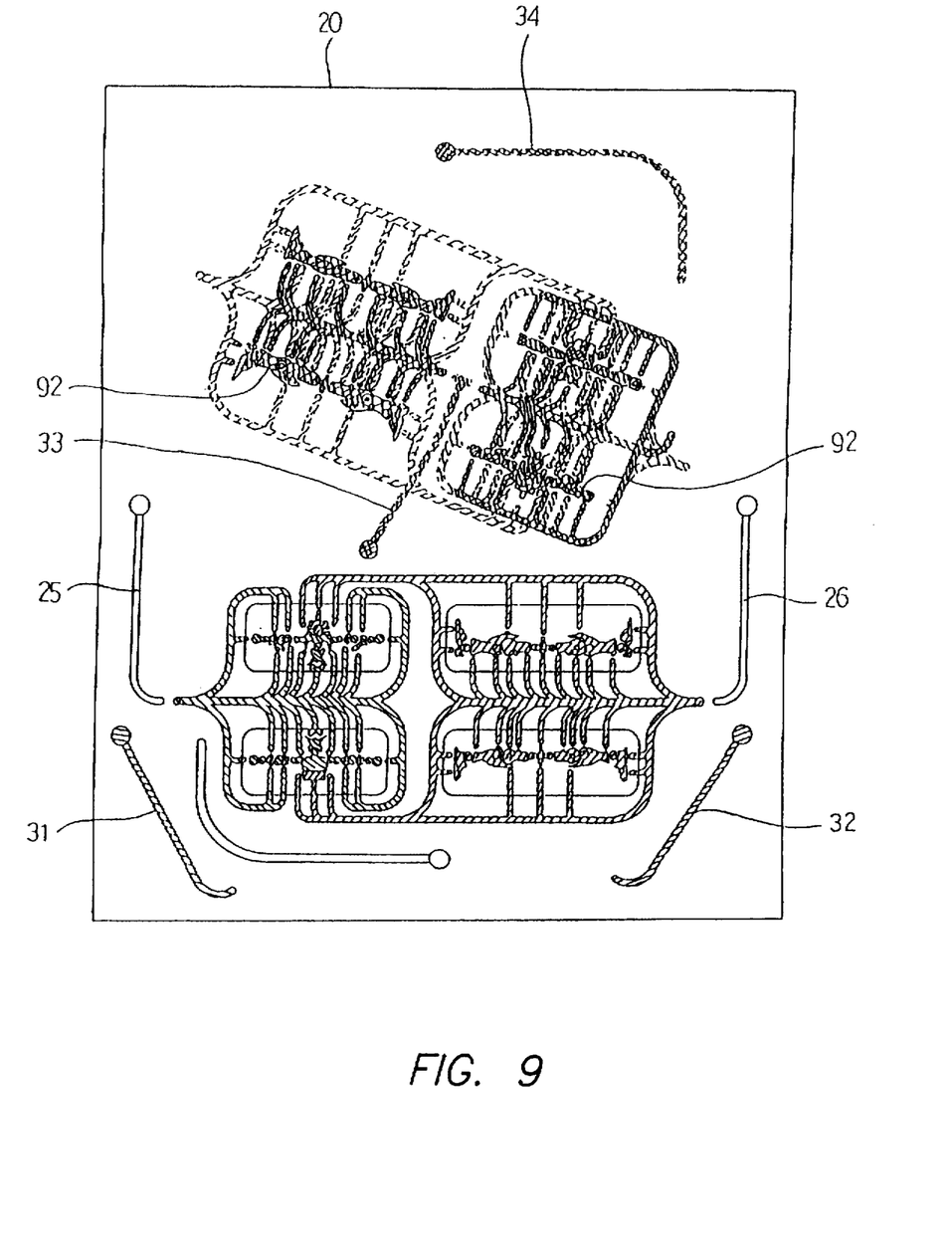
FIG. 9 is a view similar to FIG. 8, but showing the apparatus in a still different operating position.

The movable mold-defining member 2 is separated again from the stationary mold-defining member 3, as shown in FIG. 3, and the hydraulic cylinders 69 are actuated to advance the second base 67 and thereby the ejector pins 43, 45 and 46 to eject the runner 33 from the runner channel 27, as well as the secondary molded product 92, as shown in FIG. 9 The runners 31 and 32 are ejected from the runner channels 25 and 26 by the ejector pins 41 and 42. The runners 31 to 33 and the secondary molded product 92 immediately fall down off the movable mold-defining member 2. The product 92 has holes 95 formed by the interlocking pins 115 in the secondary mold 111, as shown in FIG. 15, so that another molded product may be inserted in the holes 95.

Thus, it is seen that a molding apparatus and method are provided. One skilled in the art will appreciate that the present invention can be practiced by other than the preferred embodiments which are presented for purposes of illustration and not of limitation, and the present invention is limited only by the claims which follow.

What is claimed is:

1. A molding process for use in a molding apparatus comprising a first mold and a second mold, said molding process comprising the steps of:

forming a first molded product in said first mold, said first molded product having a plurality of holes formed by a plurality of protrusions in said first mold and a plurality of projections formed by a plurality of recesses in said first mold;

transferring said first molded product to said second mold;

securing said first molded product in said second mold by engaging said plurality of holes in said first molded product with a plurality of corresponding pins in said second mold and by engaging said plurality of projections of said first molded product with a plurality of corresponding grooves in said second mold; and forming a second molded product in said second mold, wherein said second molded product includes said first molded product;

wherein said step of forming said first molded product comprises injecting a molten material into a first plurality of runner channels leading to said first mold; and further comprising the step of ejecting at least a portion of at least one runner from said first plurality of runner channels after said step of forming said first molded product;

wherein said first mold is disposed below said second mold such that said at least a portion of at least one runner ejected from said first plurality of runner channels falls away from said second mold.

2. A molding process for use in a molding apparatus comprising a first mold, a second mold and a rotatable table for moving a first molded product from said first mold to said second mold, said molding process comprising the steps of:

forming a first molded product in said first mold, said first molded product having a plurality of holes formed by a plurality of protrusions in said first mold;

rotating said rotatable table so as to transfer said first molded product to said second mold;

securing said first molded product in said second mold by engaging said plurality of holes in said first molded product with a plurality of corresponding pins in said second mold;

forming a second molded product in said second mold, wherein said second molded product includes said first molded product;

wherein said first molded product further includes a plurality of projections formed by a plurality of recesses in said first mold, and said step of securing said first molded product in said second mold further includes engaging said plurality of corresponding grooves in said second mold;

wherein said step of forming said first molded product comprises injecting a molten material into a first plurality of runner channels leading to said first mold; and further comprising the step of ejecting at least a portion of at least one runner from said first plurality of runner channels after said step of forming said first molded product.

3. The molding process of claim 2, wherein said first mold is disposed below said second mold such that said at least a portion of at least one runner ejected from said first plurality of runner channels falls away from said second mold.

4. A molding process for use in a molding apparatus comprising a first mold, a second mold, and a rotatable table for moving a first molded product from said first mold to said second mold, said molding process comprising the steps of:

forming a first molded product in said first mold, said first molded product having a plurality of projections formed by a plurality of recesses in said first mold;

rotating said rotatable table so as to transfer said first molded product to said second mold;

securing said first molded product in said second mold by engaging said plurality of projections of said first molded product with a plurality of corresponding grooves in said second mold;

forming a second molded product in said second mold, wherein said second molded product includes said first molded product;

wherein said step of forming said first molded product comprises injecting a molten material into a first plurality of runner channels leading to said first mold; and further comprising the step of ejecting at least a portion of at least one runner from said first plurality of runner channels after said step of forming said first molded product.

5. The molding process of claim 4, wherein said first mold is disposed below said second mold such that said at least a portion of at least one runner ejected from said first plurality of runner channels falls away from said second mold.

\* \* \* \* \*